June 5, 1945.  A. TOWNHILL  2,377,463

PISTON

Filed May 18, 1942

Inventor
ARTHUR TOWNHILL

Charles W. Hills Attys.

Patented June 5, 1945

2,377,463

UNITED STATES PATENT OFFICE 2,377,463

PISTON

Arthur Townhill, Cleveland, Ohio, assignor to Thompson Products, Inc., a corporation of Ohio Application May 18, 1942, Serial No. 443,353

3 Claims. (Cl. 309—14)

This invention relates to a piston for internal combustion engines and the like, and more particularly to a cast one-piece aluminum alloy piston for use in automobiles and aircraft engines.

Conventional pistons of the type indicated are fabricated with a head having peripheral ring grooves and a skirt depending from the head. The skirt usually is not subject to great stress, its function being primarily to guide the head, while the head is acted upon both by the longitudinal forces generated by explosion of cylinder gases and by the angular forces set up by the connecting rod. The head wall is weakened by the peripheral piston ring grooves formed about the head, so that on overloading, cracks are particularly likely to form in the head wall. To reinforce the head it is of course possible to thicken the head wall. Since lightness is desirable in a piston, the skirt is kept as thin as possible. When the head side walls are thickened, the transition from the thick head walls to the thin skirt walls may be either sudden or gradual. A tapering transition makes for added skirt weight while a sudden transition makes for structural weakness at the transition, or at least does not utilize all the added metal efficiently.

The problem of reinforcing the head is complicated by the fact that at the transition from the head to the skirt it is desirable to provide expansion slots and an oil collecting grooves.

Since it is also desirable to cast the piston in one piece and to cast in the expansion slots so as to decrease machining costs, some provision must also be made to permit the joining of the skirt and head metals during casting.

The inside diameter defining wall of the oil groove in the head is inwardly of the outside diameter of the skirt and the transition area from the head carrying portion of the head wall to the skirt must extend outwardly in order to continue the same in the skirt.

In the piston of the present invention, added strength is provided at the points of greatest structural weakness, i. e., in the head wall at the piston ring grooves and at the transition from the piston head to the skirt. More particularly, the piston of the present invention is fashioned with horizontal expansion slots separating head and skirt portions through slots extending along two opposed sides of the piston at the same level with their ends spaced by bridging or connecting portions above the wrist pin apertures. Inside these slots, and spaced from the skirt to define arcuate spaces extending along the inside of the skirt, two ribs depend from the piston head beyond the top of the skirt. These ribs continue the piston head walls carrying the ridges between the ring grooves and extend in parallelism with the skirt walls so as to overlap the skirt or to be telescoped therein. Further, another deeply depending reinforcing rib may extend from the head between the wrist pin bosses.

This structure provides not only greater metal content in the piston exactly where added strength is needed and without adding to the weight of the skirt but further, due to the position and direction of extension of the added metal (parallel to the applied longitudinal forces and in the form of a T-beam normal to the angularly applied forces) adds more strength and resistance against cracking and deformation than can be obtained by simply distributing the added metal all around the head wall to thicken the same.

It is, therefore, and important object of the present invention to provide a light weight one-piece cast skirted piston characterized by great structural strength.

Another object of this invention is to provide a one-piece cast skirted piston formed with peripheral slots separating head and skirt and depending reinforcing ribs extending from the head into the skirt space, in juxtaposition, to slots separating head and skirt, for the purpose of strengthening the head and to prevent cracking of the same when subjected to overloads.

A further object of the invention is to provide a one-piece cast skirted piston having horizontal peripheral slots between the wrist pin apertures at the transition from head to skirt and provided with arcuate depending head flanges spaced from the skirt extending into the skirt space so as to provide additional metal for reinforcing areas particularly liable to crack.

Other and further objects and features of this invention will become apparent from the following description of a piston shown by way of an example on the accompanying drawing and from the appended claims. The drawing shows the following views:

As shown on the drawing.

Figure 1:
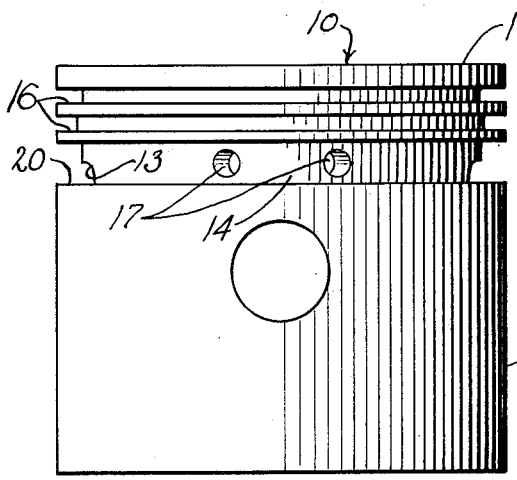
Figure 1 is an elevational view of a piston according to the present invention.
Figure 3:
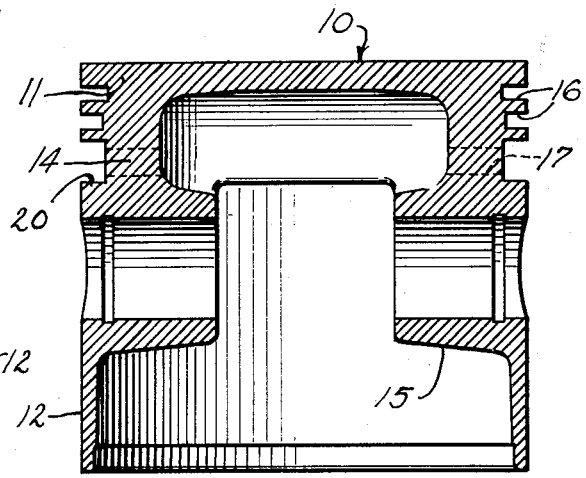
Figure 3 is a longitudinal cross sectional view taken along the line III—III of Figure 2.

A piston according to this invention, designated generally by the reference numeral 10, is formed by a head 11 and a skirt 12 separated by peripheral horizontal slots 13 except for bridging or connecting portions 14 disposed above wrist pin bosses 15. The piston head is provided with piston ring grooves 16, an oil groove 20, and oil groove draining passages 17.

The slots 13 may be formed in the bottom of the oil ring groove 20 which is wider than the piston ring grooves 16 and encircles the piston head below the ring grooves 16 at the transition from the head to the skirt. If desired, the oil ring groove 20 may be made continuous with the slots 13 or a land could be provided between the slots and groove to separate the groove from the slots.

Figure 2:
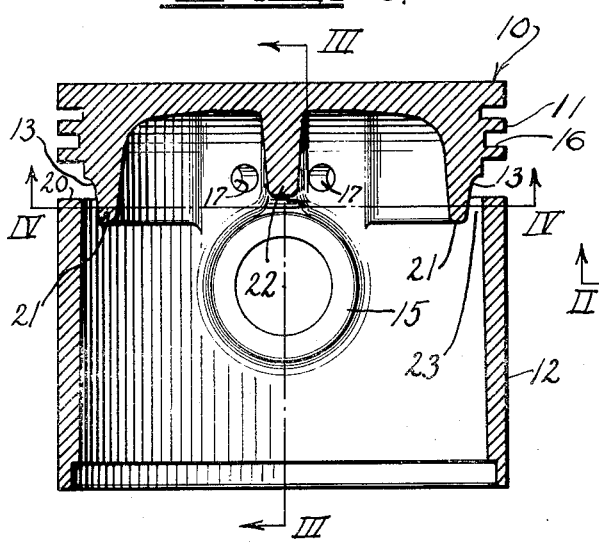
Figure 2 is a longitudinal cross sectional view taken along the line II—II of Figure 4.
Figure 4:
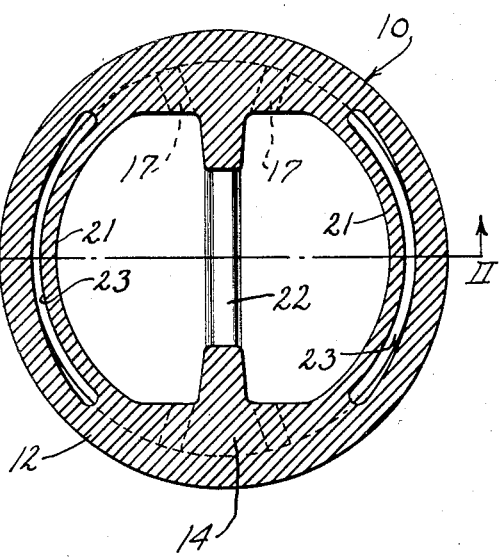
Figure 4 is a transverse cross sectional view taken along the line IV—IV of Figure 2.

As shown in Figures 2 and 4, generally arcuate flanges or ribs 21 depend from the piston head into the skirt space, defining arcuate gaps 23 continuing the slots 13. The ribs 21 merge at their ends into the bridging portions 14 and extend between opposite bridging portions 14 on each side of the piston head in general conformance with the cross sectional outline of the head wall. The function of the ribs 21 is to rigidify and reinforce the head against cracking and deformation, as explained hereinabove.

A transverse reinforcing rib 22 depending from the piston head extends between and merges into the wrist pin bosses to stiffen the head and bosses.

A one-piece cast piston of the present invention includes, generally speaking, a head and skirt separated by peripheral slots extending between the wrist pin apertures. The head is formed with depending head flanges or ribs extending within the skirt space in spaced relationship to the skirt wall to a level below the peripheral slots. Since the ribs extend parallel to the piston axis and thus parallel to the direction of the greatest forces applied to the piston in operation (i. e., downwardly), the whole section is strengthened against bending and cracking. At the same time, such thickening of the head walls as may be done is rendered much more effective to reinforce the piston since such thickening when combined with downward extension of the piston head walls increases the piston head strength cubically, rather than lineally, as mere thickening would do.

Many details of construction may be varied within a wide range without departing from the principles of this invention, and it is, therefore, not my purpose to limit the patent granted on this invention otherwise than necessitated by the scope of the appended claims.

I claim as my invention:

1. In a one-piece cast piston having a head and a skirt provided with wrist pin bosses, the improvements including said head formed with a peripheral groove defining the transition from the head to the skirt and slotted vertically at the bottom of the groove only intermediate said wrist pin bosses to communicate with the interior of said skirt, and depending head flanges extending inside of said slot into the skirt interior in spaced relationship from the skirt wall to continue the slots into the skirt along the entire lengths of the slots.

2. In a one-piece cast piston having a head formed with piston ring grooves and a skirt provided with opposed wrist pin bosses, the improvements including said head having a slotted oil groove at the transition from the head to the skirt, integral bridging portions aligned lengthwise of said piston with said wrist pin bosses to define inner wall portions of said oil groove, and depending interior head flanges extending into the skirt space between said bridging portions in spaced relationship to the skirt to define gaps continuing the slots of the oil grooves into the skirt space along the entire lengths of the slots.

3. In a one-piece piston having a head with a ring belt, a skirt, and wrist pin bosses, bridging portions aligned with said wrist pin bosses and connecting said head and skirt for rigidly supporting the skirt at the pin bosses, means including said skirt and head defining slots between said head and skirt, said slots terminating at said bridging portions, and a pair of ribs merging with said bridging portions and integral with and extending for a substantially uniform depth from the lower portion of said head and spaced from and having substantially the same contour as said adjacent surface of said skirt so as to provide a reinforcing means for said head without substantially thickening the ring belt of the head and without the slots substantially affecting the depth of the ring belt.

ARTHUR TOWNHILL.